Aug. 11, 1931.  E. P. TOURNIER  1,818,591
APPARATUS FOR SUPPORTING STRANDS
Filed March 6, 1929
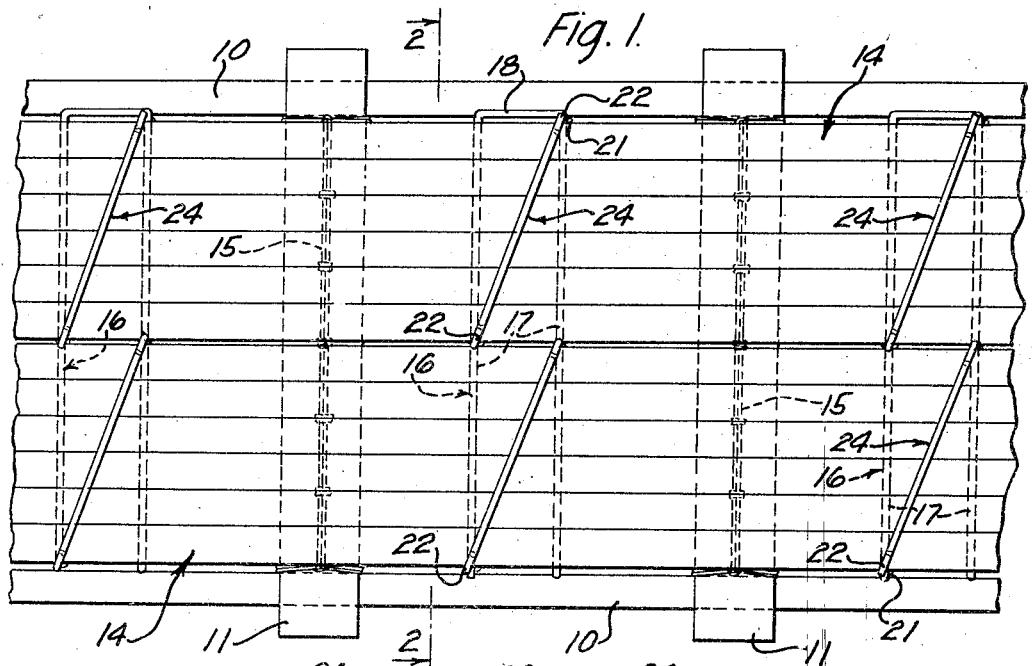
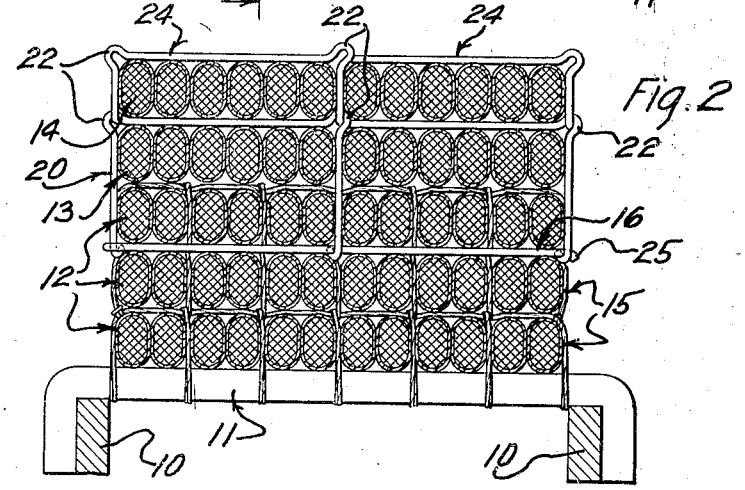
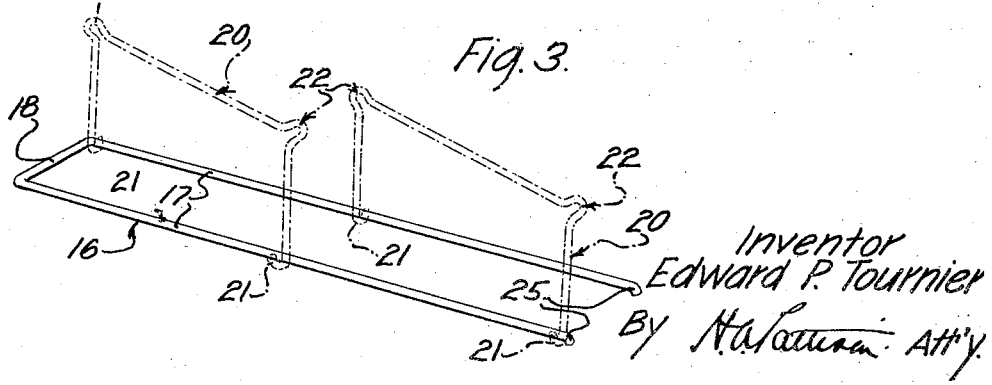
Inventor
Edward P. Tournier
By H. A. Lattman Att'y Patented Aug. 11, 1931

1,818,591

UNITED STATES PATENT OFFICE

EDWARD PAUL TOURNIER, OF ELIZABETH, NEW JERSEY, ASSIGNOR TO WESTERN ELECTRIC COMPANY, INCORPORATED, OF NEW YORK, N. Y., A CORPORATION OF NEW YORK

APPARATUS FOR SUPPORTING STRANDS

Application filed March 6, 1929. Serial No. 344,833.

This invention relates to apparatus for supporting strands, and more particularly to apparatus for attaching strands or cables to a previously supported group thereof.

In interconnecting electrical apparatus such as is employed in telephone exchanges, it is frequently the practice to assemble the individual electrical conductors or cables passing from one group of apparatus to another into units attached to and supported by suitable framework. Especially in wiring telephone exchanges with electrical conductors in cable form, it has been the practice, in some instances, to fasten the cables to each other and to the framework by means of textile strands, such as twine. In such cases, usually, a layer of cables is laced or tied to the framework by means of twine and additional layers of cables are attached in a similar manner either to the previously supported cables, their associated twine, or to the framework. Due to its character, this method of securing cables to a support is called "sewing". Such a method is somewhat slow and requires experience and a high degree of skill on the part of the workman.

With a view of eliminating the above objections, it has been proposed, as disclosed in the copending application of G. J. Houts, Serial No. 745,093, filed October 22, 1924, now Patent No. 1,719,609, issued July 2, 1929, to replace the twine with resilient wire clips for clamping the cables to the supporting framework and to each other. The use of such clips has greatly facilitated the attachment of strands or cables to a supporting framework with resultant large savings in labor, time and cost.

Due to the continuously increasing demand for telephone service, it is frequently necessary to install additional cables in telephone exchanges to accommodate the increased number of subscribers. It is the practice, usually, to support such additional cables by attaching them to the previously installed run or group of similar cables. In instances where the original run or group of cables is "sewed" to the supporting framework, it has heretofore been the practice to support the additional cables by "sewing" them to the previously "sewed" run or group thereof.

The primary object of the present invention is to provide an improved and economical apparatus for attaching strands or cables to a previously supported group thereof.

The invention contemplates the provision of a simple and efficient apparatus whereby strands or cables may be quickly and economically attached to a previously supported run or group thereof. In accordance with the invention, there is provided in one embodiment thereof, a U-shaped wire form or foundation adapted to be inserted between two layers of the previously supported group of cables. The additional cables are then clamped to the previously supported group by wire clips having hooked end portions by means of which they are attached to the parallel sides of the wire form. These clips may also be provided with loop portions whereby similar clips may be attached thereto for supporting additional cables.

In the accompanying drawings,

Fig. 1 is a fragmentary plan view of a group of cables with the first several layers thereof sewed to a supporting framework and the last two layers of cables attached thereto by the apparatus of this invention;

Fig. 2 is a vertical section taken on line 2—2 of Fig. 1, and

Fig. 3 is a perspective view of an apparatus embodying the features of the invention.

Referring now to the drawings wherein like reference numerals designate corresponding parts in the several views, it will be observed that the supporting framework comprises a pair of spaced parallel bars 10—10 having spaced cross straps 11, 11 secured thereto, in any suitable manner. A plurality of cables, preferably arranged in horizontal layers and comprising an initial installation of three layers 12, 12 and two subsequently added layers 13 and 14, are supported upon the framework. It will be noted that the cables 12 of the initial installation are "laced" or "sewed" to the cross straps 11 by means of textile strands or twine 15. The cables in each layer 12 are shown arranged in groups of two, although any other desired arrangement may be employed.

In the embodiment of the invention illustrated in the drawings, a substantially U-shaped wire form or foundation member 16 having parallel side portions 17—17 and an interconnecting end portion 18 (Fig. 3) is adapted to be inserted by threading it from one side of the group between two layers of the previously installed "sewed" cables 12, as shown in Fig. 2. Inverted U-shaped members or wire clips 20, each adapted to firmly embrace a predetermined number of the additional cables 13, are provided with oppositely bent or hooked end portions 21 for engaging the parallel sides 17 of the foundation member 16, whereby the additional layer of cables 13 is securely clamped to the previously installed group of cables 12. The members 20 are also provided with looped portions or ears 22—22 whereby similar members 24, each embracing a predetermined number of cables of the superimposed layer 14, may be conveniently attached thereto. The members 24 are also provided with looped portions or ears 22 for receiving the hooked end portions 21 of similar members embracing additional cables.

The foundation members 16 may be made from a metallic strand in any convenient lengths and after being inserted in place between two layers of previously supported cables, the ends thereof may be severed to any desired length. After severing the excess end portions, the ends of the parallel side portions 17 are preferably bent slightly, as indicated at 25, to prevent displacement of the members 20.

When attaching additional cables to a previously supported run or group thereof by the apparatus of this invention, the foundation members 16 are inserted between the last two layers of previously supported cables 12 at spaced positions longitudinally of the cables, and positioned parallel to the cross-straps 11, as shown in Figs. 1 and 2. The foundation members may be readily inserted by threading them, closed end first, from one side of the group. A predetermined number of the additional cables 13 are then embraced by the members 20 and the looped end portions 21 of these members are engaged with the opposite side portions 17 of the foundation member 16 thereby securely clamping the additional cables to the previously supported group. When desired, additional layers of cables 14 may be clamped to the members 20 by means of the clamping members 24 which, as hereinbefore described, are provided with hooked end portions 21 adapted to engage the looped portions 22 of the clamping members 20. In this manner any additional cable installations which may be required from time to time may be readily and conveniently attached to the previously installed run or group of cables without disturbing the previously attached cables.

It is to be understood that the embodiment of the invention herein illustrated and described is merely a convenient and useful form of the invention which is capable of many other modifications without departing from the spirit and scope of the invention as defined by the appended claims.

What is claimed is:

1. In an apparatus for attaching an additional strand to a group of previously supported strands, a foundation member designed to be inserted between contiguous previously supported strands, and means for embracing the additional strand and having a portion for engaging the foundation member, to firmly clamp the additional strand to the previously supported group.

2. In an apparatus for attaching a strand to a group of previously supported strands, a foundation member having spaced parallel side portions adapted to be inserted between contiguous layers of the previously supported strands, and a wire clip for embracing the additional strand and having hooked portions for engaging the side portions of the foundation member to firmly clamp the additional strand to the previously supported group.

3. In an apparatus for attaching additional cables to a group of previously supported cables, a U-shaped foundation member designed to be inserted between closely adjacent layers of the previously supported cables, and an inverted U-shaped clamping member for embracing a predetermined number of the additional cables and having hooked portions for engaging the foundation member to securely attach the additional cables to the previously supported group.

4. In an apparatus for attaching additional cables to a group of previously supported cables, a substantially U-shaped wire form designed to be inserted between contiguous layers of the previously supported cables, and means for embracing the additional cables and having a portion for engaging the wire form to firmly clamp the additional cables to the previously supported group.

In witness whereof, I hereunto subscribe my name this 20th day of February, A. D. 1929.

EDWARD PAUL TOURNIER.